Nov. 8, 1932.   J. H. WAGENHORST   1,886,610
VEHICLE WHEEL
Filed Aug. 2, 1924   2 Sheets-Sheet 1

Inventor
James H. Wagenhorst
By
Church & Church
Attorneys

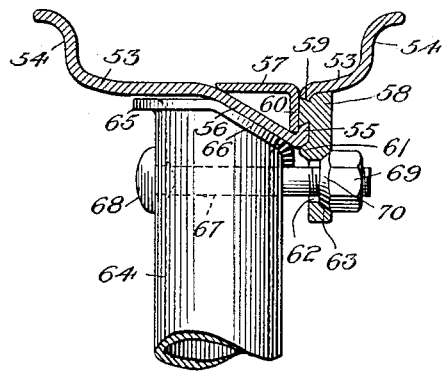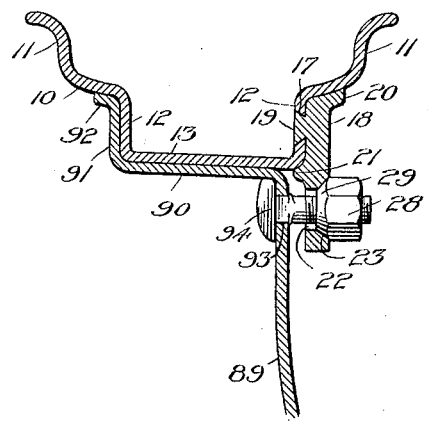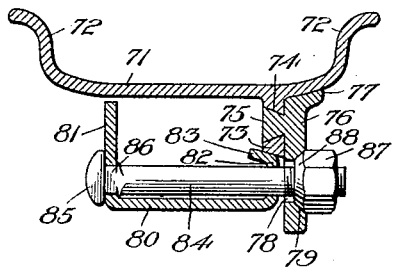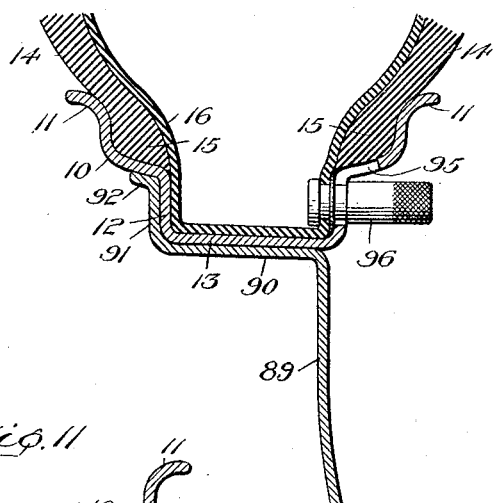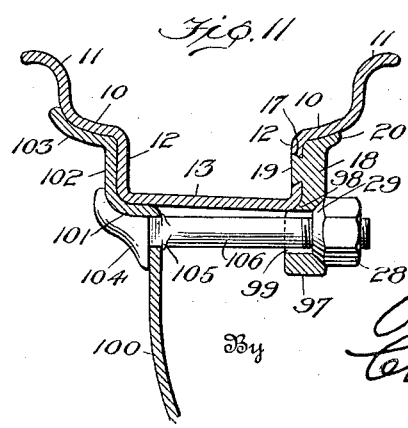

Patented Nov. 8, 1932

1,886,610

UNITED STATES PATENT OFFICE

JAMES H. WAGENHORST, OF JACKSON, MICHIGAN

VEHICLE WHEEL

Application filed August 2, 1924.   Serial No. 729,685.

My invention relates to improvements in vehicle wheels and has to do, more particularly, with vehicle wheels equipped with demountable rims, and especially demountable rims of the attached lug type.

The principal object of my present invention is to provide an improved construction of demountable rim for vehicle wheels, having securing lugs which are attached to a portion projecting inwardly from the rim base by fastening or attaching means which do not pass through the rim base, or that portion of the rim on which the beads of the tire seat. My invention is particularly well suited for use in connection with rims of the dropped base type in which a channel-like depression is formed in the rim base.

A further object of my invention is to provide a demountable rim construction of the attached lug type of such a nature that the operation of riveting or upsetting the riveting studs to fasten the securing lugs to the rim is simpler and may be more easily performed than in the constructions heretofore used.

A further object of my invention is to provide a demountable rim construction of the attached lug type in which the lugs are of such form that they may be manufactured at less cost and with less material than has been the case heretofore.

A further object of my invention is to provide a demountable rim construction of the attached lug type in which the securing lugs are so attached to the rim that there are no possible irregularities of surface due to riveting at points or zones where the tire beads seat on the rim base.

A further object of my invention is to provide an improved wheel construction such that the cost of the wheel and, in the case of a spoked wheel, the number of spokes to be employed, may be reduced. I propose, in this connection, to provide a wheel construction using a demountable rim of the dropped base type with securing lugs firmly fastened or attached thereto, thus eliminating the use of a felly construction and seating the rim directly on the ends of the spokes.

A further object of my invention is to provide an improved and simplified wheel construction using a dropped base rim with securing lugs attached thereto and detachably mounted on a simple and light felly band mounted on the ends of the wheel spokes.

A further object of my invention is to provide an improved disk wheel construction which can be manufactured very cheaply and which results in a considerable saving in weight.

A further object of my invention is to provide a rim construction so formed as to permit the valve stem of the tire to pass therethrough in a novel manner so as to permit more easy access to the valve stem from the outside of the wheel and to provide a construction by which the operator can remove the tire from the rim and mount a new tire thereon more easily than has been the case heretofore.

Further objects, and objects relating to details and economies of construction and operation, will definitely appear from the detailed description following. The following specification sets forth devices and means by which I have accomplished the objects of my invention in several instances. My invention is clearly defined and pointed out in the appended claim. Structures constituting preferred embodiments of my invention are illustrated in the accompanying drawings, forming part of this specification, in which,—

Fig. 6 is a detail sectional view taken on the line 6—6 of Fig. 5.

Fig. 7 is a radial sectional view through the peripheral portion of a wheel constituting still another embodiment of my invention.

Fig. 8 is a radial sectional view through the metal felly of a wheel showing another form of rim embodying my invention mounted on said felly.

Fig. 9 is a radial sectional view of the peripheral portion of another form of disk wheel showing a rim embodying my invention mounted thereon.

Fig. 10 is a radial sectional view of the wheel shown in Fig. 9 taken at the valve stem to illustrate the relation of the valve stem to the rim; and Fig. 11 is a radial sectional view through the peripheral portion of a modified form of disk wheel and rim embodying my invention.

In the drawings, the same reference numerals refer to the same parts throughout the several views.

Figure 1:
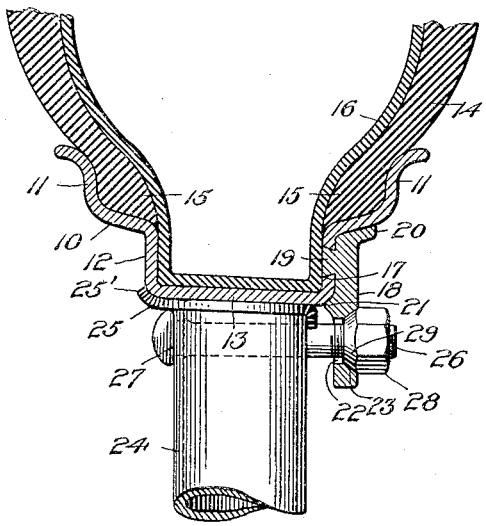
Figure 1 is a radial sectional view through a rim, tire and the outer portion of a wheel body constructed in accordance with my invention.

In general, one feature of my invention consists in the means by which I fasten the securing lugs in a firm and rigid manner to a portion of the rim, which projects inwardly of the wheel from the rim base, without perforating the rim base for the purpose of receiving riveting studs or similar attaching means. In connection with a rim of the dropped base type, in which a channel-like depression is formed in the rim base, I propose to perforate one of the side walls of this channel-like depression and to provide the securing lugs with fastening studs which pass through said perforations and are secured to the rim in any suitable manner, as, for instance, by riveting or upsetting said fastening studs over the edges of said perforations. I also propose, in the case of a rim having a bead or rib projecting inwardly of the wheel from the rim base, to perforate said bead or rib, forming apertures extending substantially parallel to the rim base and to provide securing lugs which engage one face of said rib or bead and have fastening studs going through such apertures and fastened to the bead in any suitable manner, such as, for instance, by riveting or upsetting the ends of said fastening studs over the edges of the apertures in the bead or rib.

A rim of the dropped base type has a number of advantages, among which may be noted the fact that the channel-like depression formed in the rim base stiffens the rim materially against radial and lateral distortion and makes the rim much stronger. Inasmuch as added strength is given to the rim by this dropped base formation, this type of rim becomes the equivalent of both the usual rim and its felly, and it is possible, by using a rim of the dropped base type, to eliminate the usual felly or to reduce it in size, weight and cost materially, thus providing a lighter and cheaper wheel body on which a rim of this dropped base type may be detachably mounted. The popularity of tires of larger cross sectional area, commonly known as balloon tires, has resulted in an increased use of rims of the dropped base type. The use of balloon tires results in rims of smaller diameter, and the greater flexibility of the side walls of balloon tires lends itself to the use of the dropped base construction in connection with the mounting on and demounting of the tires from the rim. I propose, according to one embodiment of my invention, to employ a demountable rim having a dropped base with securing lugs firmly and rigidly fastened to the dropped base portion of the rim and to detachably mount such a rim upon the ends of spokes without any intervening felly. In this connection, I propose to use tubular metal spokes having their outer ends flanged to provide seats suitably inclined to receive the dropped base portion of the demountable rim. These spokes may carry securing bolts co-operating with securing lugs in the manner common to the attached lug type of rim. I also propose to use this dropped base type of rim, having securing lugs attached to the dropped base portion, with a wheel in which a simple felly band is mounted on the ends of the spokes, thus reducing the cost of the felly construction materially. I also propose to construct a disk wheel, using this dropped base type of rim with the securing lugs fastened to the dropped base portion, and with this construction I am enabled to simplify materially the construction of the wheel disk, since a simple peripheral flange appears to give all the strength and rigidity that is needed, in view of the stiffening effect imparted to the rim by the dropped base construction. In connection with this construction, I propose to slot the dropped base portion of the rim, so as to permit a straight valve stem to project laterally from the tire through the side of the dropped base portion of the rim. This provides a very convenient means for getting access to the valve stem for inflating or deflating the tire.

Figure 2:
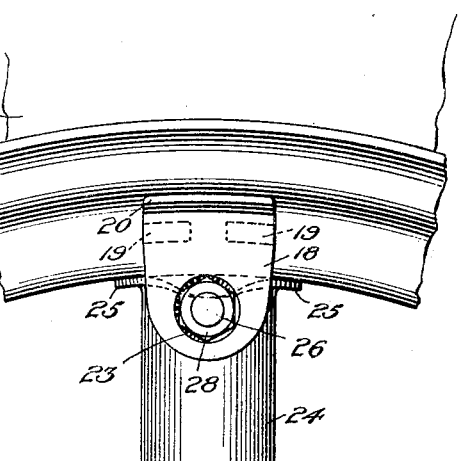
Fig. 2 is a fragmentary view in side elevation of the wheel illustrated in Fig. 1.

Referring to the accompanying drawings, in which I have illustrated several constructions constituting embodiments of my invention which I have found particularly desirable, Figs. 1 and 2 show a construction in which a rim of the dropped base type is detachably mounted directly on the ends of tubular metal spokes, without any intervening felly. The rim is provided with a rim base 10, and with the side flanges 11, of the form shown in the drawings, if the rim is designed for use with straight-side tires, or of the well known hook formation, if the rim is designed for use with clincher tires. A channel-like depression is formed in the central portion of the rim base 10, extending circumferentially of the rim. This channel-like depression comprises the side walls 12 and the inner wall 13

13. The side wall 12 at the front side of the wheel is higher than the side wall at the rear side of the wheel, so that the inner wall 13 of the depression forming the dropped base is inclined or tapered from front to rear of the wheel, so as to form a conical surface having its lesser diameter at the front of the wheel. A tire 14 is shown mounted on the rim with the beads 15 seating on the portions of the rim base 10 at the sides of the dropped base portion. The tire is provided with the usual inner tube 16. The front side wall 12 of the dropped base portion of the rim has a plurality of apertures 17 formed therein for the reception of riveting studs on the securing lugs 18. The rim is provided with any suitable number of securing lugs 18, for instance, one for each spoke of the wheel, and each securing lug 18 lies against the front face of the front side wall 12 and has integral riveting studs 19 which pass through the apertures 17 and are riveted or upset, as shown in Fig. 1, so as to secure the lug 18 rigidly and firmly to the dropped base portion of the rim. The lug may also be provided with an outer portion 20 which underlies the corresponding rim base 10 and supports the lug against strains acting from the rear side of the wheel in a direction tending to displace the lugs. The lug may also have a shoulder 21 which engages under the inner wall 13 of the dropped base portion. The lower portion of each lug 18 has a bolt hole 22 formed therein and the front or outer end of this bolt hole is enlarged or countersunk at 23. The diameter of this bolt hole 22 is greater than the bolt which is to pass through it, so as to afford considerable clearance between the bolt and the edge of the hole in order that the bolt may pass easily through this hole when the rim is to be removed. The wheel illustrated in these views includes a wheel body consisting of a plurality of tubular metal spokes 24 connected to a hub in any suitable manner. The upper end of each spoke 24 is flanged at 25 so as to provide a suitable inclined seat on which the inner wall 13 of the dropped base portion of the rim may rest. The flange 25, at the rear edge, may be turned up to form a shoulder 25' engaging the rim to limit the lateral displacement thereof. A securing bolt 26 extends transversely through the end of each spoke 24 just below the flanges 25, said bolt having a head 27 and being secured in the spoke against turning, in any suitable manner. The threaded end of the bolt 26 is adapted to extend through the bolt hole 22 of one of the lugs 18 secured to the demountable rim, when said demountable rim is mounted correctly in position. A nut 28 is screwed on the threaded end of the bolt 26 and has a conical face 29 which engages the countersunk portion 23 of the bolt hole 22.

According to this construction, the securing lugs 18 are rigidly and firmly fastened to the rim by the integral riveting studs 19 passing through the apertures 17 and upset or riveted in place. This provides a very strong and rigid connection between the lug and the rim. A large part of the lateral stress exerted upon the lug by the nut 28, as it is screwed up, is transmitted directly by the lug 18 to the dropped base portion of the rim through the engagement of the lug 18 with the side wall 12 of said dropped base portion. The riveting studs 19 do not pass through the portion 10 of the rim on which the tire beads seat and, hence, there are no possible irregularities of surface at these points to interfere with the perfect seating of the tire. With this construction, the riveting or upsetting of the fastening studs 19 can be performed very conveniently, inasmuch as the co-acting surfaces of the lug and the rim, which would be engaged by a press in the riveting operation, are flat. The lug is of such construction that it can be made from what is practically a flat bar. This bar may be sheared up into sections of proper length to form the lugs and, due to the fact that the bar from which the lugs are made is practically flat, there is a considerable saving in the cost of making the lugs.

It will be noted that, in this construction, the spokes do not carry any fixed rim or felly and that the rim is demountably positioned directly upon the ends of the spokes. This is made possible by the stiffening of the rim due to the dropped base construction and it results in a correspondingly cheaper and lighter wheel.

Figure 3:
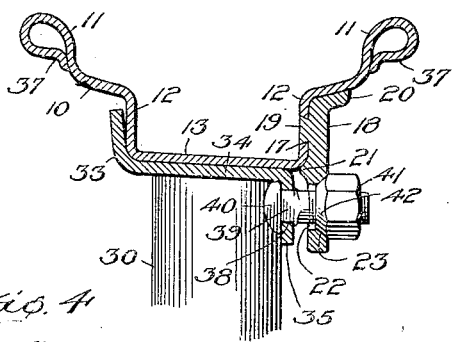
Fig. 3 is a radial sectional view through the felly portion of a wheel and rim showing another embodiment of my invention.
Figure 4:
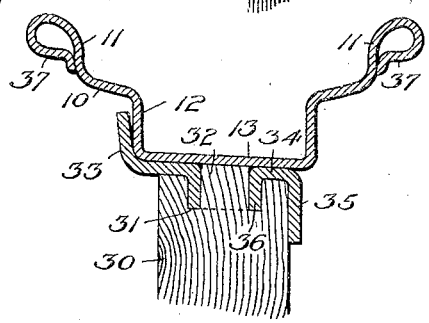
Fig. 4 is another radial sectional view of the modification shown in Fig. 3, showing the connection between the felly band and the end of a spoke.

In Figs. 3 and 4, I have shown another form of wheel embodying my invention. According to this embodiment, a felly band 34 is mounted on the outer ends of the wood spokes 30 and receives the demountable rim. The end of each wood spoke has a circular cut or groove 31 formed therein, leaving a central tenon 32. The felly band is of substantially Z-shape having an outwardly extending rear flange 33 and an inwardly extending front flange 35. The body portion of the felly band 34 is inclined slightly so as to form a substantially conical surface, having its smaller diameter at the front of the wheel, upon which surface the demountable rim may seat. At the points of connection with the spokes, the body portion of the felly band 34 is perforated and punched out forming the cylindrical bosses 36 which fit in the circular grooves 31 and surround the tenons 32. The felly band 34 is of very simple construction and may be rigidly secured to the spokes in any suitable manner, yet, notwithstanding the simple construction of the felly band, it provides ample strength when used in connection with a demountable rim of the dropped base type.

The rim shown in Figs. 3 and 4 is of substantially the same construction as that shown in Fig. 1, but, in this instance, the rim may be made of lighter material and strengthened by turning back the edges against the side flanges 11, as shown at 37. The securing lugs 18 are firmly and rigidly fastened to the dropped base portion of the rim by the same construction which has been described with reference to Figs. 1 and 2. The front flange 35 of the felly band is perforated at intervals providing the holes 38 through which the securing bolts 39 pass. The heads 40 of these securing bolts engage the rear face of the front flange 35 and the bolts are held against turning in any suitable manner. The threaded end of each bolt extends through the bolt hole 22 of one of the lugs 18, and the nut 41 screwed on the end of the bolt 39 has a conical face 42 engaging the countersunk portion 23 of the bolt hole in substantially the same way as in the construction shown in Figs. 1 and 2.

Figure 5:
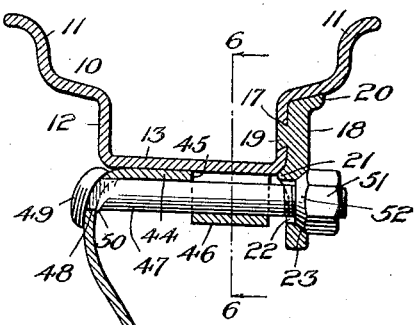
Fig. 5 is a radial sectional view through the peripheral portion of a disk wheel, with a rim mounted thereon, showing another embodiment of my invention.

In Figs. 5 and 6, I have shown a demountable rim of the dropped base type having securing lugs rigidly fastened to the dropped base portion of the rim and mounted on the periphery of a wheel disk. In this construction, the wheel disk 43 has a peripheral flange 44 formed thereon, which flange is inclined inwardly toward the front of the wheel so as to form a conical surface having its small diameter at the free edge of the flange and at the front side of the wheel. This provides an inclined or tapering seat corresponding to the inclination or taper of the inner wall 13 of the dropped base portion of the demountable rim. At intervals, the flange 44 is slit as at 45 and has a portion 46 depressed so as to receive, guide and support a securing bolt 47, as shown in Figs. 5 and 6. The disk 43 has a hole 48 formed therein adjacent the flange 44, and the bolt 47 extends through the hole 48 and through the guide formed by the depressed portion 46 of the flange. The head 49 of the bolt engages the rear face of the wheel disk and the bolt is held against turning in any suitable manner, as by upsetting a portion 50 of the bolt against the front face of the disk surrounding the hole 48. The demountable rim is provided with securing lugs 18 rigidly and firmly fastened to the dropped base portion of the rim, in the same manner heretofore described with respect to Figs. 1 and 2. The bolt 47 extends through bolt hole 22 of the lug 18 and the nut 51 screwed on the end of the bolt has a conical face 52 engaging the counter-sunk portion 23 of the bolt hole, in the same manner as in the construction shown in Figs. 1 and 3. The provision of the channel-like depression in the demountable rim forming the dropped base of the rim gives so much strength and rigidity to the rim that a very simple disk formation will provide ample strength, and, consequently, the peripheral flange 44 gives sufficient strength when employed with this dropped base type of rim and this provides a very simple disk wheel construction for use with a demountable rim having attached securing lugs.

In Fig. 7, I have shown a construction in which the rim is provided with a dropped base which differs somewhat from that shown in Figs. 1, 3 and 5. In the construction illustrated in this view, the rim has a base 53 and side flanges 54, and the rim base is provided with a channel-like depression having the front side wall 55 and the inclined wall 56, so as to form a depression which is substantially triangular in cross section. A filler 57 may be positioned in the depression, if desired. The securing lugs 58 have integral fastening or riveting studs 60 extending through apertures 59 formed in the side wall 55 in the dropped base portion of the rim. Each securing lug 58 has a bolt hole 62 formed therein provided with a countersunk portion 63 at the front end of this hole. This bolt hole is to receive the fastening bolt and is of greater diameter than the fastening bolt so as to provide considerable clearance to facilitate the removal of the rim. This rim is detachably mounted upon the ends of tubular metal spokes 64 having flanges 65 and 66 at their ends. The flanges 66 are inclined to correspond with the inclination of the wall 56 of the dropped base portion of the rim, as clearly shown in Fig. 7, and these flanges provide a seat for the demountable rim. The lugs 58 may have shoulders 61 extending under the dropped base portion of the rim, as illustrated. The fastening bolts 67 extend transversely through the ends of the spokes, each bolt having a head 68 on one end and the other end being threaded and extending through the bolt hole 62 and carrying a nut 69 screwed on the threaded end of the bolt 67 and having a conical face 70 engaging the counter sunk portion 63 of the bolt hole.

In Fig. 8, I have shown another modification in which the rim has a rim base 71 provided with side flanges 72 and stiffened by an inwardly projecting portion 73 in the form of a bead or rim. This rim is shown mounted upon a fixed rim or felly consisting of a metal channel carried by the spokes and having an inner wall 80, a rear side wall 81, and a front side wall 82. The front side wall 82 has an inclined flange 83 and the inner edge of the rib 73 is correspondingly tapered or inclined and is adapted to seat on the flange 83 when the rim is mounted in position.

In order to secure the demountable rim to the fixed rim, I have provided a plurality of securing lugs 76 having integral fastening or riveting studs 75 extending through apertures 74 formed in the rib 73 and secured thereto in any suitable manner, as by riveting or upsetting the ends of the studs 75. The lug 76 may have a portion 77 underlying the rim base to give a more adequate support for the lug. Each lug 76 has a bolt hole 78 formed therein, the front end of said bolt hole being countersunk as at 79. Fastening bolts 84 extend through the felly or fixed rim, each bolt having a head 85 engaging the rear face of the rear flange 81 and a squared portion 86 fitting in a correspondingly shaped hole in the rear flange 81, the shank of the bolt 84 extending through said hole in the rear flange and an alined hole in the front flange 82 and projecting through the bolt hole 78 in the lug 76. A nut 87 screwed on the end of the bolt 84 may have a conical face 88 engaging the countersink 79, so that as the nut 87 is screwed up the rim is secured in position with the inner edge of the rib 73 seating upon the inclined flange 83 of the fixed rim.

In Fig. 9, I have shown a rim of substantially the construction illustrated in Fig. 1 and provided with securing lugs 18 attached thereto, as shown in Fig. 1, mounted on the peripheral flange of a wheel disk. In this embodiment, the wheel disk 89 is bent laterally, forming the inclined or flaring flange 90 which provides a conical surface having its smaller diameter at the front end of said flange. The disk is then bent outwardly to form the back flange 92 which is adapted to engage the rear face of the rear side wall 12 of the dropped base portion of the rim. If desired, this flange may be bent laterally at 92 so as to underlie somewhat the rim base 10 at the rear side of the rim. Bolts 93 are provided, extending through holes in the disk adjacent the flange 90 and having heads 94 engaging the rear face of said disk and held against turning in any suitable manner. Nuts 28 are screwed on the ends of said bolts 93 and engage the securing lugs 18, in the same manner as has already been described with reference to Fig. 1. I have provided this rim with a slot 95, as shown in Fig. 10, said slot being formed partly in the front side wall 12 of the dropped base portion of the rim and partly in the rim base 10 at the front side of the rim. The inner tube 16 mounted within the tire 14 has a valve stem 96 which projects laterally from the tire through the slot 95 so that it is accessible from the front side of the wheel. This provides a valve stem construction which is particularly suitable for use with disk wheels, in that a straight valve stem may be employed and the valve stem may project to the front of the wheel without perforating the disk or bending it away to give access to the valve stem. By carrying the slot 95 up into the rim base, as shown, I provide means by which the valve stem may be swung around in removing the tire, so that this operation may be easily accomplished.

In Fig. 11, I have shown a rim substantially the same as that shown in Fig. 1, mounted upon the periphery of a wheel disk of somewhat different formation. The disk 100 is bent laterally at 101, forming a slight circumferential flange on which the rear portion of the inner wall 13 of the dropped base of the rim is adapted to seat. The disk is then bent outwardly at 102, forming a flange which engages the rear side wall of the dropped base, and the disk is then bent laterally at 103, forming a flange which underlies the rim base at the rear side of the rim. Securing lugs 18 are rigidly fastened to the dropped base portion of the rim by the means shown in Fig. 1, but the lug shown in Fig. 11 differs from that shown in Fig. 1, in that the inner portion of the lug is made thicker, as at 97. The securing bolt 106 extends through a hole in the disk near the flange 101 and has a head 104 shaped to conform to the flanges 101 and 102 and engaging the same. This bolt may be held in position against removal or turning by any suitable means, such as by upsetting a portion of the metal of the bolt against the front face of the disk surrounding the bolt hole, as shown at 105. The bolt 106 extends through the enlarged bolt hole 99 in the lug 18, and the nut 28 screwed on the bolt 106 has a conical face 29 which engages the countersunk end 98 of the hole 99, as shown in Fig. 11.

I have shown my invention as applied to a rim for straight side tires, but it will be perfectly obvious that it is not to be confined to that class of rims, as it is also applicable to rims for clincher tires. I have shown my invention in connection with tubular metal-spoked wheels, disk wheels, and wood spoked wheels, but I wish it to be understood that my invention is not to be confined to wheels of these classes only, but is also applicable to wheels of other classes, such as, for instance, wire spoked wheels. I have shown my invention embodied in a rim of the dropped base type, but, although this construction is important, my invention is not, in all its aspects, to be confined thereto, as I contemplate the fastening of a securing lug to any portion of the rim extending inwardly from the rim base, without perforating or having portions projecting through that part of the rim on which the tire beads seat.

I am aware that the particular constructions shown in the accompanying drawings may be changed considerably without departing from the spirit of my invention and, therefore, I desire to claim my invention broadly, as indicated by the appended claim.

Having thus described my invention, what I claim as new and useful and desire to secure by Letters Patent, is:

The combination of a wheel body and a plurality of securing bolts carried thereby near the periphery thereof, a demountable rim seated on the periphery of said wheel body and having a rim base and a portion projecting inwardly therefrom, said portion having a plurality of apertures formed therein, a plurality of securing lugs engaging the side of said portion and having riveting studs extending laterally into said apertures and upset, each of said lugs having a bolt hole adapted to receive the end of one of said securing bolts and an outer portion underlying and supporting the rim base at the adjacent side of the rim, and nuts screwed on the ends of said bolts and engaging said lugs to hold the demountable rim seated on the periphery of said wheel body.

JAMES H. WAGENHORST.